3,429,581
SEALING CONNECTION
Franz Himmel, Schliersee, Germany, assignor to
Fritz Drexler, Babenhausen, Germany
Filed May 12, 1965, Ser. No. 455,160
Claims priority, application Germany, May 15, 1964,
H 52,703
U.S. Cl. 277—180                                    17 Claims
Int. Cl. F16j *15/00;* B65d *53/00;* F16l *25/00*

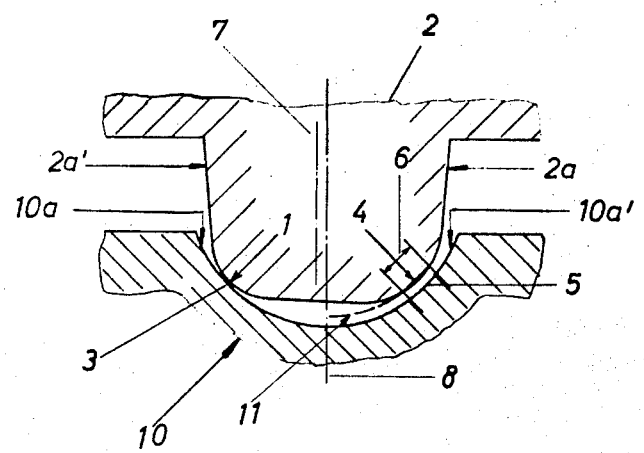
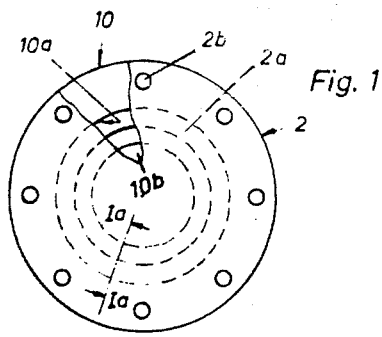
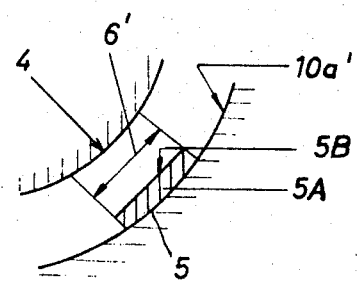
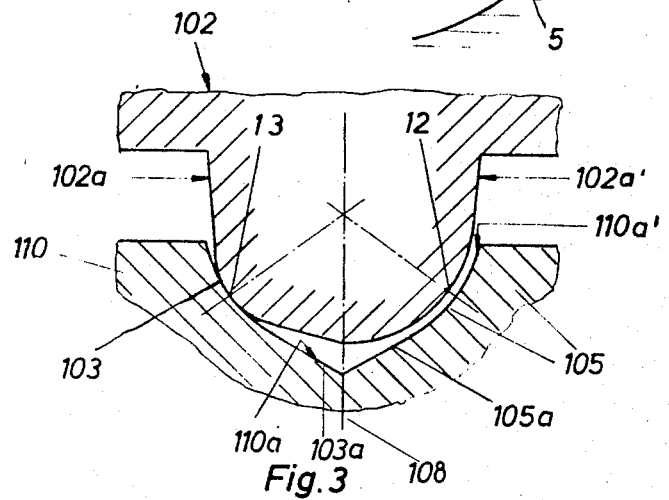
Fig. 1a
Fig. 1
Fig. 2
Fig. 3

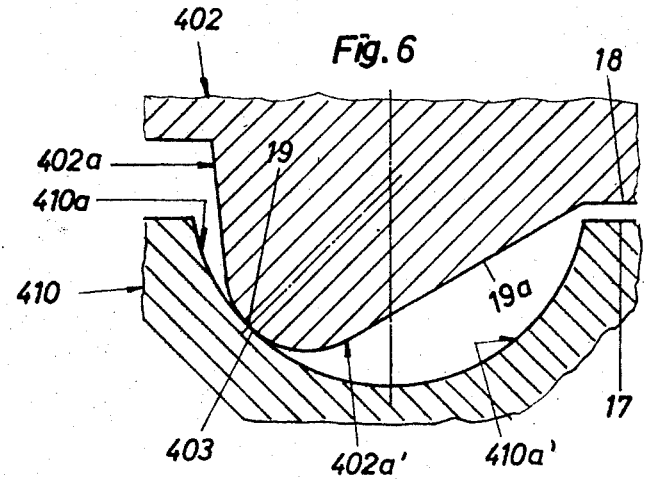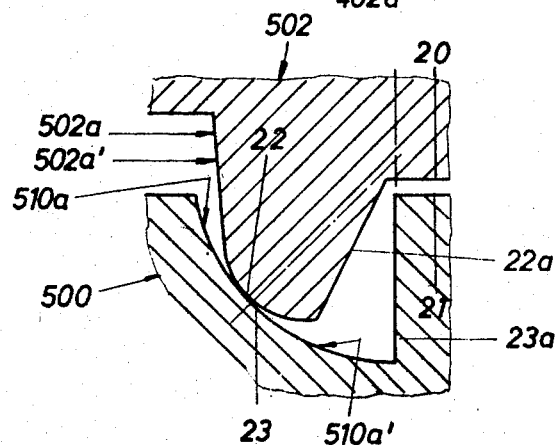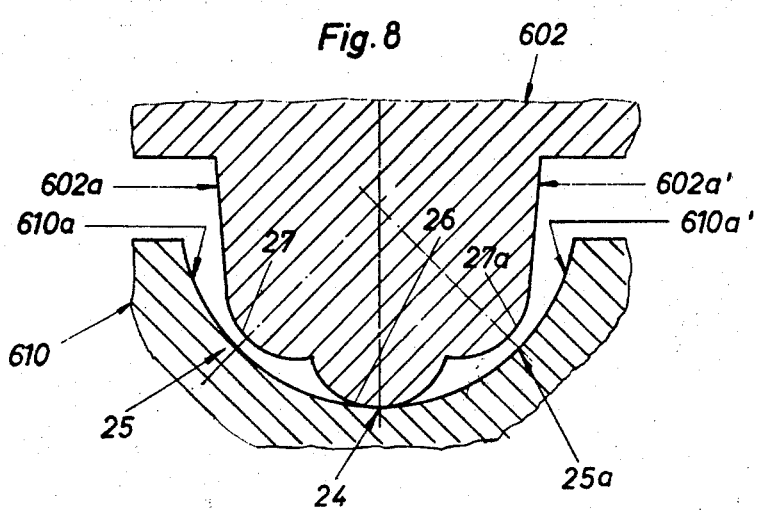

ABSTRACT OF THE DISCLOSURE

A sealing connection includes a female sealing member having a groove bounded by a first surface, and a male sealing member comprising a projection extending into the groove. The projection has a second surface a sealing portion of which abuts against and forms a seal with a sealing portion of the first surface. At least one of the sealing portions consists of deformable material abutting the corresponding sealing portion of the other surface whereby the area of contact between the sealing portions increases in response to stresses forcing the projection deeper into the groove. The surfaces further have cooperating stop portions abutting against each other at least at such times when the area of contact between the sealing portions increases to a predetermined value.

---

The present invention relates to fluid seals in general, and more particularly to improvements in fluid seals of the type wherein the projection of a male sealing member extends into a groove provided in a female sealing member. The improved fluid seal may be utilized to prevent leakage of fluid between the abutting annular flanges of fluid conveying pipes, between a cap and one end of a pipe, between a fluid-containing vessel and a lid and/or between other types of fluid-containing or fluid excluding bodies. The sealing action between the male and female sealing members which constitute the improved fluid seal may be effective between a straight, spherical, arcuate or endless projection of circular, oval or polygonal outline and the surface bounding a groove whose configuration is complementary to that of the respective projection. For example, the projection may resemble a ring, a portion of a sphere, a wedge or the like.

In many heretofore known fluid seals of this general character, the material which is adjacent to the abutting portions of the projection on the male sealing member and the female sealing member will undergo elastic deformation when the sealing members are subjected to strong pressures which tend to force the projection deeper into the groove of the female coupling member. Such pressures may be transmitted by bolts, screws or similar threaded fasteners, for example by utilizing the fasteners to connect the abutting flanges of two pipes. If the pressure prevailing in the interior of the pipes is very high, the bolts or screws must be drawn tight to prevent leakage of fluid along the surface of the projection and along the surface which bounds the groove of the female sealing member. However, if the pressure in the interior of the pipes decreases, the compressive stresses transmitted by the bolts or screws might result in excessive (permanent) deformation of one or both sealing members.

Accordingly, it is an important object of the present invention to provide a fluid seal which is constructed and configured in such a way that the portions of male and female sealing members which actually form the seal are protected from excessive stresses so that they will undergo only such deformation which is within the elastic limits of the material of which the sealing members are made.

Another object of the invention is to provide a fluid seal of the just outlined characteristics which can stand long periods of use and whose sealing action is not affected, or is affected very little, by repeated changes in pressure of the fluid whose flow should be prevented from or into a pipe line, a vessel or another fluid-containing or fluid-surrounded structure.

A further object of the invention is to provide a very simple, compact and easy-to-produce fluid seal which can be produced at low cost and which can be installed in all or nearly all types of fluid-containing or fluid-surrounded structures which, at the present time, utilize much more complicated and highly expensive fluid seals.

An additional object of my invention is to provide a fluid seal which will positively prevent leakage of a gaseous or liquid fluid despite the fact that it need not comprise washers, gaskets and similar separate parts which are indispensable in most conventional fluid seals.

A concomitant object of the invention is to provide a fluid seal wherein the projection of the male sealing member cooperates with the female sealing member in such a way that the sealing action between the two members remains intact even if the pressure of fluid at the one or the other side of the seal fluctuates within a very wide range.

Another object of the instant invention is to provide a fluid seal which is capable of preventing leakage of fluid between a single pair or between two or more pairs of cooperating surfaces and which is not only useful in structures which accommodate or are surrounded by low-pressure fluid but also in structures wherein the sealing action should prevent leakage of a fluid whose pressure exceeds many times the normal atmospheric pressure.

Briefly stated, one feature of my invention resides in the provision of a fluid seal which comprises a female sealing member having a preferably annular groove bounded by a first annular surface, and a male sealing member comprising a preferably annular projection extending into the groove of the female sealing member and having a second surface including a flat, concave or convex portion abutting against and forming an annular seal with a portion of the first surface. At least one of the two sealing members consists at least in part of deformable material extending along the sealing zone so that the area of contact between the two surfaces increases in response to stresses which tend to force the projection deeper into the groove. In accordance with an important feature of the invention, the two sealing members are provided with one, two or more pairs of cooperating, preferably annular, stop faces or bumpers which abut against each other at least at such times when the area of contact between the two surfaces increases to a predetermined value corresponding to a maximum permissible deformation of the sealing members. Thus, the stop faces act not unlike bumpers or brakes to prevent permanent deformation of material along the actual sealing zone.

Each of the two stop faces may form part of the respective surface, and the area of contact between the two stop faces may exceed several times the maximum area of contact between such portions of the two surfaces which form the actual seal. On the other hand, it is also possible to provide each of the two sealing members with a stop face which may have a relatively small area but is defined by a relatively hard portion of the respective sealing member so that, when they abut against each other, the stop faces prevent further deformation of such portions which form the actual seal between the two sealing members. The purpose of the stop faces is to prevent excessive deformation of the sealing members in the zone where the sealing members form the actual seal, and also to form a secondary seal which by itself prevents or reduces leakage of a gaseous or liquid fluid along the two surfaces.

The fluid seal of the present invention preferably consists of metallic, rigid plastic or other relatively hard material. Such fluid seals are often called hard seals.

The novel features which are considered as characteristic of the invention are set forth in particular in the appended claims. The improved fluid seal itself, however, both as to its construction and the mode of assembling the same, together with additional features and advantages thereof, will be best understood upon perusal of the following detailed description of certain specific embodiments with reference to the accompanying drawings, in which:

FIG. 1 is a diagrammatic top plan view of a fluid seal which is constructed and assembled in accordance with a first embodiment of my invention, a portion of the male sealing member being broken away;

FIG. 1a is an enlarged fragmentary axial section as seen in the direction of arrows from the line Ia—Ia of FIG. 1;

FIG. 2 is an enlarged sectional view of a detail of the structure illustrated in FIG. 1a, further showing a ring-shaped insert which defines one of the stop faces;

FIG. 3 is a fragmentary axial section through a third fluid seal wherein the surface bounding the groove of the female sealing member comprises concave and flat portions;

FIG. 6 is a fragmentary axial section through a sixth fluid seal wherein the stop faces are adjacent to the groove of the female sealing member;

FIG. 7 is a fragmentary axial section through a seventh fluid seal which constitutes a modification of the fluid seal shown in FIG. 6; and FIG. 8 is a fragmentary axial section through an eighth fluid seal which comprises two pairs of stop faces.

Figure 4:
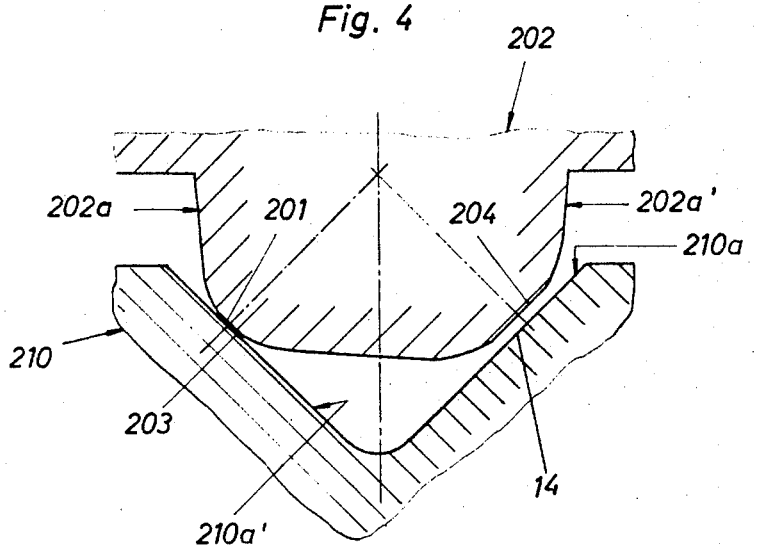
FIG. 4 is a similar fragmentary axial section through a fourth fluid seal wherein the two stop faces are flat.

Referring first to FIG. 1, there is shown a fluid seal which comprises a tubular female sealing member 10 and a disk-shaped or plate-like male sealing member 2. The marginal portion of the male sealing member 2 is detachably secured to an annular flange of the female sealing member 10 by a series of bolts 2b or by similar threaded fasteners which cause an annular projection or rib 2a at the underside of the male member 2 to penetrate into an annular groove 10a provided in the top face of the flange on the female member 10.

The manner in which the projection 2a cooperates with the flange of the female sealing member 10 to prevent escape of a gaseous or liquid fluid from the bore 10b of the member 10 is illustrated in FIG. 1a. The projection 2a is bounded by an annular surface 2a' having a convex portion 1 which is in substantially linear contact with the adjacent portion 3 of a concave surface 10a' bounding the groove 10a. The radius of curvature of the surface portion 1 is smaller than the radius of curvature of the surface portion 3 so that, when the bolts 2b are not driven home with a very strong force, the surface portions 1 and 3 form a seal extending along a circle whose center is located on the axis of the female sealing member 10. FIG. 1a shows that the sealing members 2 and 10 form a seal at one side of the projection 2, and this seal (between the surface portions 1 and 3) may be provided at the inner side or at the outer side of the projection 2a. The cross section of the projection 2a is asymmetric.

In accordance with an important feature of my invention, the sealing members 2 and 10 are respectively provided with cooperating stop faces 4 and 5 which come into actual abutment with each other when the projection 2a and/or the female sealing member 10 is deformed along the surface portion 1 and/or 3 to such an extent that the area of contact between the surface portions 1 and 3 increases to a predetermined maximum value. The stop face 5 is of concave shape and forms part of the surface 10a'. The stop face 4 of the projection 2a is of convex shape and forms part of the surface 2a'. The numeral 6 shown in FIG. 1a denotes the width of that part or zone of the stop face 4 which comes into actual contact with the adjoining stop face 5 when the area of contact between the surface portions 1 and 3 increases sufficiently to bring the stop face 4 into actual abutment with the stop face 5. The purpose of the stop faces 4 and 5 is to prevent excessive deformation of the material along the surface portions 1 and 3 in response to tightening of the bolts 2b.

In FIG. 1a, the surface portions 1 and 3 are in a mere linear contact with each other. In order to make sure that the area of contact increases, the operator will tighten the bolts 2b so that the stop faces 4 and 5 come into actual abutment with each other whereby the material adjacent to the portion 1 and/or 3 undergoes elastic deformation. The fluid seal of FIGS. 1 and 1a is then in a condition to withstand such pressures of fluid in the bore 10b which shaft the male member 2 axially and away from the flange of the female sealing member 10 so that the elastic deformation disappears and the surface portions 1 and 3 are again in a mere linear contact with each other. If the pressure of fluid in the bore 10b decreases, the stress transmitted by the tightly drawn bolts 2b causes renewed deformation of material along the surface 1 and/or 3 so that the stop faces 4 and 5 move toward or into actual abutment with each other to prevent permanent deformation of material along the surface portions 1 and 3. The area of contact between the stop faces 4 and 5 (i.e., the area of the annular zone 6) may be a multiple of the maximum area of contact between the surface portions 1 and 3. For example, the area of the annular zone 6 may exceed between two and ten times the maximum area of contact between the surface portions 1 and 3. The phantom line 11 indicates in FIG. 1 that the stop face 4 on the propection 2a may extend toward the center of the surface 10a' (see the line 8) so that the area of contact between the stop faces 4 and 5 may approximate or even exceeds one-third of the area of the surface 10a'. Of course, it is also possible to dimension the projection 2a in such a way that the stop faces 4 and 5 move into abutment with each other as soon as the surface portion 1 abuts against the surface portion 3. In such fluid seals, the deformation of material along the surface portions 1 and 3 will progress at the same rate as the deformation of material along the stop faces 4 and 5; however, since the areas of the stop faces are larger, such stop faces will determine the maximum penetration of the projection 2a into the groove 10a, and such maximum penetration will be selected with a view to insure that the deformation of material along the surface portions 1 and 3 invariably remains within elastic limits. The radius of curvature of the stop face 5 may be different from the radius of curvature of the surface portion 3.

The lines 7 and 8 respectively indicate the symmetry planes of the cross sections of the projection 2a and groove 10a, and it will be noted that such symmetry planes are offset with reference to each other.

FIG. 2 shows that the concave surface 10a' bounding the groove 10a of the female sealing member 10 may be provided with an annular insert 5A whose exposed surface 5B constitutes a stop face and cooperates with the stop face 4 of the projection 2a. The width of the area of contact between the stop faces 4 and 5B is indicated by the numeral 6'. The insert 5A forms a ring which may consist of suitable metallic material and whose hardness may exceed the hardness of the material of the sealing member 2 and/or 10. It will be seen that the stop face 5B is flat, rather than concave as the stop face 5, so tha the stop faces 4 and 5B will move into full face-to-face abutment with each other if the material of the projection 2a and/or ring 5A undergoes a certain deformation.

The ring 5A may be loosely inserted into the groove 10a or it may be detachably or permanently affixed to the female sealing member 10. A second ring may be attached to the projection 2a. It is further clear that such ring or rings may be recessed into the surface 2a' or 10a'. Also, such rings may be provided along the surface portion 1 or 3. If desired, the ring 5A may be replaced by two or more rings. If the material of the sealing members 2 and 10 is very hard, the ring or rings may consist of softer material especially if such rings are embedded in the surface portion 1 and/or 3.

FIG. 3 illustrates a portion of a modified fluid seal comprising a male sealing member 102 and a female sealing member 110. The projection 102a of the male sealing member 102 is similar to the projection 2a but the configuration of the groove 110a is different from that of the groove 10a. The surface 110a' bounding the groove 110a comprises two concave portions 103, 105 and two mutually inclined flat portions 103a, 105a which meet along a circle whose diameter is the same as the diameter of an imaginary cylinder 108 halving the projection 102a. The surface 102a' of the projection 102a comprises a first convex portion 13 which moves into abutment and forms a seal with the concave surface portion 103, and a second convex surface portion 12 which constitutes a stop face and may move into actual abutment with the stop face constituted by the concave surface portion 105. The function of the stop faces 12, 105 is the same as that of the stop faces 4 and 5. The radius of curvature of the stop face 12 is greater than the radius of curvature of the surface portion 13, and the same holds true for the stop face 4 and surface portion 1 of the projection 2a shown in FIG. 1a.

In FIG. 4, the projection 202a of the male sealing member 202 extends into a groove 210a of a female sealing member 210. The surface 202a' of the projection 202a comprises a convex portion 201 which comes into abutment with a flat portion 203 of the surface 210a' bounding the groove 210a. The surface 202a' further comprises a flat portion 204 which constitutes a first stop face and which may come into actual abutment with a second stop face constituted by a second flat portion 14 of the surface 210a'. Thus, in FIG. 4, the stop faces 204 and 14 are flat, and one of the surface portions 201, 203 is also flat. The cross section of the groove 210a resembles an isosceles triangle.

Figure 5:
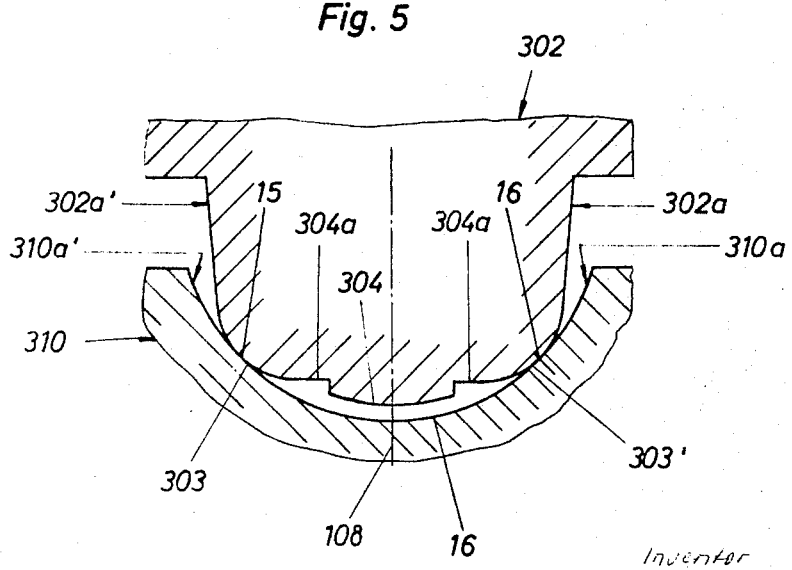
FIG. 5 is a fragmentary axial section through a fifth fluid seal wherein the sealing members form two seals and wherein the stop faces are located between the two seals.

FIG. 5 illustrates a further embodiment of my invention wherein the male sealing member 302 comprises an annular projection or rib 302a whose surface 302a' has convex portions 15, 16 located at the opposite sides of the center of imaginary cylinder 108 and respectively abutting against concave portions 303, 303' of the surface 310a' bounding the groove 310a in a female sealing member 310. The stop faces 304 and 16 respectively form part of the surfaces 302a', 310a' and are located between the convex surface portions 15, 16. When the surface portions 15, 16 respectively abut against and are in a mere linear contact with the concave surface portions 303, 303', the distance between the stop faces 304, 16 is such that these stop faces come into actual abutment with each other before the material of the sealing member 302 and/or 310 undergoes permanent deformation in response to such pressures which increase the area of contact between the surface portions 15, 303 and 16, 303'. It will be seen that the radii of curvature of the surface portions 15, 16 are smaller than the radius of curvature of the surface 310a'. The structure shown in FIG. 5 forms two annular sealing zones and the cross section of the projection 302a comprises two halves which are mirror symmetrical with reference to a plane passing through the phantom line 108 and normal to the plane of FIG. 5.

The transition between the surface portions 15, 16 and the stop face 304 may be gradual, i.e., the notches 304a could be omitted, and it is equally possible to provide similar notches between the surface portions 303, 303' and the stop face 16.

Referring to FIG. 6, there is shown a fluid seal comprising a female sealing member 410 having an annular groove 410a of nonsymmetrical cross section bounded by a concave surface 410a'. The surface 410a' comprises an annular portion 403 which comes into linear or larger-area contact with a convex portion 19 of the surface 402a' bounding an annular projection 402a of nonsymmetrical cross section which forms part of a male sealing member 402. The surface 402a' also comprises a flat portion 19a which is inclined with reference to the axis of the female sealing member 410. The stop faces 17, 18 are located outside of the confines of the groove 410a and each thereof is flat. In the embodiment of FIG. 6, the stop face 18 constitutes the underside of that portion of the male sealing member 402 which is surrounded by the projection 402a, and the stop face 17 is at least slightly spaced from the stop face 18 when the surface portions 19, 403 are in a mere linear contact with each other. Again, the stop faces 17, 18 will prevent permanent deformation of the material which is adjacent to the surface portion 19 and/or 403 when the male sealing member 402 is subjected to the action of forces which tend to move the projection 402a deeper into the groove 410a.

It will be seen that the cross section of the projection 402a resembles a triangle having sides of different length. It is also clear that the fluid seal of FIG. 6 can be modified so as to have two or more pairs of cooperating stop faces and/or to form two or more annular sealing zones. For example, the projection 402a could have an annular protuberance extending from the surface portion 19a and abutting against the adjoining portion of the surface 410a so that the fluid seal of FIG. 6 would resemble or be analogous to the fluid seal of FIG. 5.

The sole difference between the fluid seals of FIGS. 6 and 7 is that the width of the projection 502a on the male sealing member 502 is less than the width of the projection 402a, and that the surface 510a' bounding the groove 510a in the female sealing member 510 comprises a concave annular portion 23 and a truly cylindrical portion 23a. The stop faces 20, 21 are located inwardly or outwardly of the groove 510a. The sealing zone is formed by the surface portions 22 and 23. It is to be borne in mind that the width of gaps between the stop faces of the fluid seals shown in the drawings is exaggerated for the sake of clarity. The width of such gaps can be minimal and will depend on the hardness of materials of which the sealing members are made, on the magnitude of compressive forces which tend to move the projection into the groove, and also on the elasticity of materials. For example, the width of the gap between two cooperating stop faces may be in the range of one or more tenths or hundredths of a millimeter.

Referring finally to FIG. 8, there is shown a fluid seal comprising a male sealing member 602 having an annular projection 602a, and a female sealing member 610 having an annular groove 610a bounded by a concave annular surface 610a'. The surface 602a' of the projection 602a comprises a convex annular central portion 26 which is shown in a mere linear contact with a centrally located portion 24 of the surface 610a', the surface portion 24 being located in the deepmost zone of the groove 610a. The projection 602a also comprises two stop faces 27, 27a which are respectively adjacent to the stop faces 25, 25a of the female sealing member 610. Thus, the actual sealing zone (between the surface portions 24, 26) is located between the pairs of stop faces 25, 27 and 25a, 27a. Obviously, the surface portions 24, 26 need not be located substantially midway between the stop faces 25, 25a, or 27, 27a, and it is equally clear that the distance between the stop faces 25, 27 and the surface portions 24, 26 may be more or less than the distance between the surface portions 24, 26 and the stop faces 25a, 27a. Also, the projection 602a could be replaced by a projection which would correspond to the left-hand or right-hand half of the projection 602a.

It is further clear, that certain features of the fluid seals shown in FIGS. 1 to 8 could be combined in a single fluid seal. For example, the fluid seal of FIG. 8 could have a second pair of surface portions 24, 26 and such second pair of surface portions could be located between the stop faces 27, 27a, to the left of the stop face 27, or to the right of the stop face 27a. Furthermore, inserts similar to the ring 5A of FIG. 2 could be used in some or each of the remaining fluid seals, not only to define stop faces but also to define such surfaces or surface portions which actually prevent leakage of a gaseous or liquid fluid.

If the material of the male and/or female sealing member is of uniform hardness, the area of contact between the stop faces will preferably exceed the area of contact between such surface portions which form the actual sealing zone. However, it is equally within the scope of my invention to utilize male and female sealing members wherein the hardness of material along the stop faces exceeds the hardness of material along the actual sealing zone. In such fluid seals, the area of contact between the sealing faces may equal or is less than the area of contact between the surface portions which form the actual sealing zone. All that counts is to provide the projection of the male sealing member and the female sealing member with one or more surface portions which can be moved into substantially linear contact with each other in response to a relatively low pressure, and to provide the two sealing members with one or more pairs of stop faces which can come into contact with each other at the same time as the surface portions which form the sealing zone or in response to a certain deformation of material along such surface portions, as long as the stop faces prevent excessive (permanent) deformation of and damage to the material along the actual sealing zone or zones. As stated before, the stop faces will also provide a seal, but their main or equally important purpose is to prevent excessive deformation of certain other portions of the male and female sealing members.

When sepaking of flat surface portions or stop faces, I wish to differentiate from concave or convex surfaces and/or faces. However, when a portion of an annular surface or stop face is defined as being flat, this term is intended to express that an axial section through such a surface or stop face is a straight line. For example, the stop faces 14, 204 shown in FIG. 4 are defined as being flat even though each of these surfaces actually resembles the mantle of the frustum of a cone if the projection 202a is an annulus and if the groove 210a is of annular shape. The same holds true for the stop face 5B of the ring-shaped insert 5A shown in FIG. 2.

Without further analysis, the foregoing will so fully reveal the gist of the present invention that others can, by applying current knowledge, readily adapt it for various applictions without omitting features which fairly constitute essential characteristics of the generic and specific aspects of my contribution to the art and, therefore, such adaptations should and are intended to be comprehended within the meaning and range of equivalence of the following claims.

What is claimed as new and desired to be secured by Letters Patent is:

1. A fluid seal comprising, in combination, a female sealing member formed with a groove having two opposite edges and an inner surface including a female sealing portion and a female stop portion which are at least in part oppositely inclined with reference to one another; and a male sealing member formed with a sealing projection bounded by an outer surface including a male sealing portion and a male stop portion, said projection extending into said groove located between said edges thereof, and with said male sealing portion and said male stop portion both being located within said groove and said sealing members being movable towards and away from one another between a spaced position in which said sealing portions are spaced apart and an abutting position in which said sealing portions sealingly abut one another, said stop portions being located in spaced position of said sealing members at a greater distance from each other than said sealing portions, at least one of said sealing portions consisting of resilient material so as to be sealingly compressible against the other sealing portion upon exertion of a predetermined force moving said sealing members to said abutting position, and said stop portions being shaped and constructed so as to be less compressible than said one sealing portion in direction of movement and upon exertion of said predetermined force so that engagement of said stop portions during movement of said members towards one another and in response to compression of said one sealing portion precludes compression of said one sealing portion beyond a predetermined limit.

2. A fluid seal as defined in claim 1; and further comprising means operatively associated with said members for effecting movement thereof to said abutting position.

3. A fluid seal as defined in claim 1, wherein said female stop portion of said inner surface is concave and said male stop portion of said outer surface is convex.

4. A fluid seal as defined in claim 1, wherein said stop portions of said inner and outer surfaces are flat.

5. A fluid seal as defined in claim 1, wherein at least one of said stop portions is flat.

6. A fluid seal as defined in claim 1, wherein said female sealing portion and said female stop portion of said outer surface are convexly curved, and wherein said male stop portion of said outer surface has a radius of curvature greater than that of said male sealing portion of said outer surface.

7. A fluid seal as defined in claim 1, wherein said female sealing portion and stop portion of said inner surface are concavely curved, and wherein the radius of curvature of said female stop portion of said inner surface is greater than the radius of curvature of said female sealing portion of said inner surface.

8. A fluid seal as defined in claim 1, wherein the material of said sealing members in the region of said stop portions is harder than the material of said one sealing portion.

9. A fluid seal as defined in claim 1, wherein at least one of said sealing members includes an insert which defines the respective stop portion, the material of said insert having a hardness greater than that of said material of said one sealing portion.

10. A fluid seal as defined in claim 1, wherein said groove and said projection are annular.

11. A fluid seal as defined in claim 10, the cross-sections of said groove and said projection having symmetry planes which are offset with reference to one another.

12. A fluid seal as defined in claim 9, wherein said insert is a ring located in said groove.

13. A fluid seal as defined in claim 10, wherein each of said surfaces includes an additional stop portion radially spaced from the first-mentioned stop portion of the respective surface, said additional stop portions abutting against each other when said first-mentioned stop portions abut against one another.

14. A fluid seal as defined in claim 13, wherein the first-mentioned and additional stop portions of the respective surfaces are mirror-symmetrical with reference to each other.

15. A fluid seal as defined in claim 10, wherein each of said surfaces includes an additional sealing portion spaced from the first-mentioned sealing portion of the respective surface, said additional sealing portions also being adapted to sealingly abut one another in said abutting positions of said members.

16. A fluid seal as defined in claim 15, wherein the stop portion of each surface is located between the first-mentioned and the additional sealing portion of the respective surface.

17. A fluid seal as defined in claim 1, wherein said sealing members consist of metallic material and wherein said stop portions are arranged for preventing permanent deformation of such metallic material.

References Cited

UNITED STATES PATENTS

| 2,238,462 | 4/1941 | Crepeau | 285—331 |
| 2,511,134 | 6/1950 | Stranberg | 285—382.7 X |
| 2,746,486 | 5/1956 | Gratzmuller | 285—334.4 X |
| 3,159,302 | 12/1964 | Latham et al. | 277—236 X |
| 3,264,012 | 8/1966 | Giovanazzi et al. | 285—334 4 X |

FOREIGN PATENTS

| 504,698 | 8/1951 | Belgium. |
| 1,272,997 | 8/1961 | France. |
| 952,482 | 11/1956 | Germany. |
| 1,004,002 | 3/1957 | Germany. |
| 636,268 | 3/1962 | Italy. |

SAMUEL ROTHBERG, Primary Examiner.

J. S. MEDNICK, Assistant Examiner.

U.S. Cl. X.R.

277—236: 285—331 334.4